Patented Aug. 20, 1935

2,011,728

UNITED STATES PATENT OFFICE 2,011,728

PRINTING THICKENER

Arnold Pfister, Clifton, N. J.

No Drawing. Application September 25, 1931, Serial No. 565,199

2 Claims. (Cl. 87—28)

Materials in common use as thickeners in certain printing, for instance, of textiles, are, besides solutions of starch flour, dextrine or gum acacia, so-called prepared vegetable gum solutions, that is to say, solutions of those gums (as tragacanth, karaya and shiraz) which cannot be formed by mere application of cold water but only by additional treatment, as by application of heat.

A thickener in any case, besides serving as a vehicle for carrying to the fabric the color and other materials used in the printing, must penetrate deeply into the fibers, regardless of whether the materials conveyed are pigments (as zinc oxide), dyestuffs or other materials used in printing, either separate or in combinations; its penetrability must not be retarded when on the one hand such materials are acid, as mordants, or on the other hand are strongly alkaline (as vat colors) and therefore necessitate neutralizing the thickener (if it is a normally acid gum) with an alkali; and it must also deposit the color where wanted and it must act to prevent the color from spreading, by capillary attraction, beyond the limits of its allotted space. Of the thickeners mentioned solutions of the gums are preferably used because of their superior working qualities, deep penetrability, quality of forming sharp impressions and solubility.

This invention relates to the manufacture of the indicated prepared vegetable gum solutions for use as thickeners in printing textiles and its object is to avoid the presence of certain defects which limit their use as such.

It is known that the mentioned gums in the natural state are limited in solubility and that this detracts from the penetrability of the solutions thereof.

Furthermore, solutions of these gums exhibit certain qualities unfavorably affecting their efficiency as thickeners when they meet with materials used in or incident to the printing. For instance, since the thickener often has to be used with vat colors, which require alkalis, the necessary neutralizing of the thickener when it consists of a solution of one of the mentioned (normally acid) gums in its natural state causes the thickener solution to lose its free-flowing, syrupy character and to jell or coagulate.

Each of the mentioned gums in its natural state contains some calcium compound in the form of a salt, such as a calcium carbohydrate, and I have discovered that if the calcium element is disunited from the remainder of this compound the gum solution will then be devoid of the mentioned defects. This may be effected in the gum solution by precipitation or dialysis. The calcium compound then resulting need not necessarily be the subject of any further treatment, for even if present in the solution the latter shows marked improvement over the untreated solution; however, I prefer to avoid the deposit of the thus-resulting calcium compound on the fabric and, on drying thereof, its tendency to leave the fabric harsh and to form a blanket on the fabric which might retard the penetration thereof by the gum solution, wherefore the solution may be filtered or so treated as to render such compound soluble.

My treatment results in practice in a gum solution which is syrupy-bodied, keeps well, prints deeply and sharply, whether acidified or made strongly alkaline, does not produce precipitation upon the addition of soluble carbonates and does not jell or coagulate with alkalis or mordants and which, if filtered, is clear and light-colored.

By way of example, only, I mention the following procedure by which the invention may be carried out:

15 lbs. of one of the indicated prepared gums is soaked in sufficient water to produce 100 lbs. of the gum and water mixture, and to this is added 7 lbs. of a 10% solution of sodium carbonate. Stir well and heat, if necessary, to effect precipitation. When this procedure is followed the calcium elements are disunited from the remainder of a substantial amount of the molecules constituting the calcium compound present in the gum being treated, that is to say, an amount which, in any event, leaves the gum solution possessing all the advantages that I have ascribed to it. Of course the amount of sodium carbonate used will vary somewhat depending on the acidity of the solution as well as the actual original calcium content of the gum. Instead of sodium carbonate I may use any other suitable precipitant, as potassium carbonate or ammonium oxalate.

If desired, the solution may then be filtered to remove the calcium salt resulting from the splitting of the original calcium compound; or such salt may be rendered soluble by introducing into the solution some solvent thereof as hydrochloric acid.

Having thus fully described my invention, what I claim is:

1. A thickener for use in printing consisting of a prepared gum solution having the calcium elements disunited from the remainder of a substantial amount of the molecules constituting the calcium compound present in the gum.

2. A thickener for use in printing consisting of a prepared gum solution having the calcium elements removed from the remainder of a substantial amount of the molecules constituting the calcium compound present in the gum.

ARNOLD PFISTER.